Oct. 4, 1966  C. B. ANDERMAN, JR  3,277,305
PHOTOELECTRIC AUTOMATIC SPEED REGULATOR FOR CONVEYOR
Original Filed Nov. 25, 1960  2 Sheets-Sheet 1
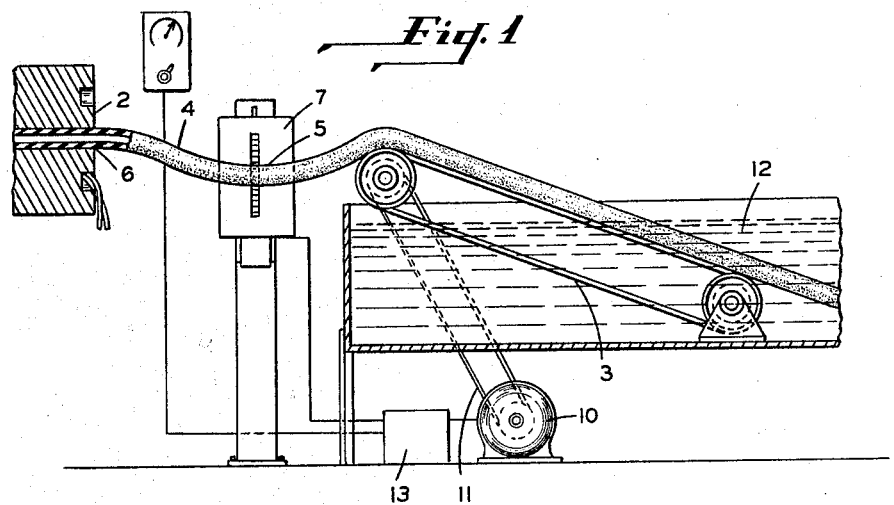
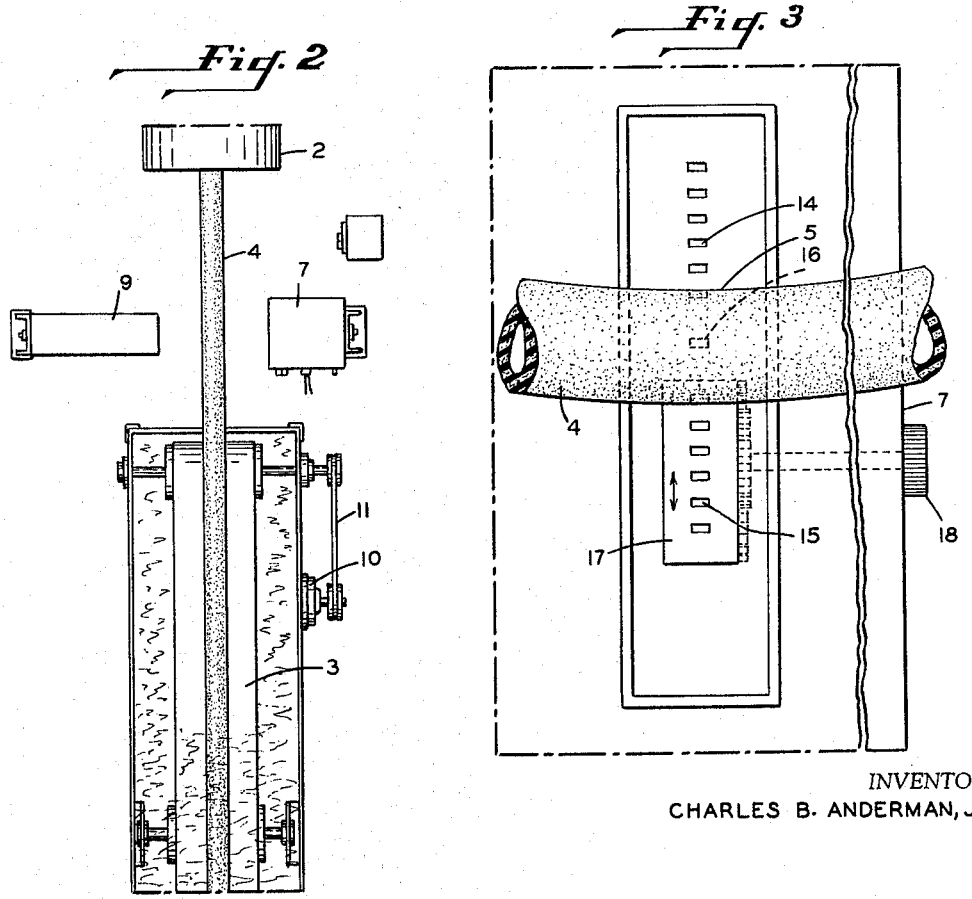
INVENTOR
CHARLES B. ANDERMAN, JR.
BY  *George F. Herr*
ATTORNEY

INVENTOR
CHARLES B. ANDERMAN, JR.
ATTORNEY

United States Patent Office 3,277,305
Patented Oct. 4, 1966

3,277,305
PHOTOELECTRIC AUTOMATIC SPEED
REGULATOR FOR CONVEYOR
Charles B. Anderman, Jr., 837 Hillaire Road,
Lancaster County, Pa.
Original application Nov. 25, 1960, Ser. No. 71,696.
Divided and this application Jan. 11, 1965, Ser. No. 424,472
3 Claims. (Cl. 250—219)

This application is a division of my copending application Ser. No. 71,696, filed Nov. 25, 1960, and now abandoned.

This invention relates to an apparatus for producing a strip of highly extensible material and controlling the tension on said strip while suspended immediately after formation at which point the material, because of its physical characteristics, cannot be touched by any mechanical device.

In the production of continuous lengths of strip material which is highly extensible when first formed, such as strips of foamed or cellular material made of synthetic rubber or the like, it is necessary to partially cure the exterior surface of the strip to form a skin so that the material will not be deleteriously affected by its engagement with the conveyor. During the short period of time the newly formed strip is being subjected to this initial cure in the atmosphere it cannot be contacted by any mechanical device such as a control device to regulate the speed of the take-away conveyor. Because of this problem considerable difficulty has been encountered in controlling the amount of tension placed on the strips while passing through this air gap immediately after formation and before passing onto the take-away conveyor.

The most common device used to form strips of this type is an extrusion die, and as is well known to those who have had experience with extrusion dies of this type, extreme difficulty is encountered in attempting to operate such die at a uniform continuous speed. It is therefore necessary that the conveyor carrying the strip of material to the curing chamber be controlled to operate at substantially the same speed as the extrusion die. Due to the nature of the plastic foamed material it is impossible to place the strip under tension because such tension would stretch the material sufficiently to change the cross-sectional dimension thereof. On the other hand, if the material is permitted to hang in an uncontrolled manner in a dip or festoon between the extrusion die and the conveyor, the weight of the material itself in this festoon will cause the same to stretch, making it impossible to control the cross-sectional dimension of the material. It is therefore necessary that the amount of material suspended between the extrusion die and the conveyor be very carefully controlled so that the conveyor does not place the material under undue tension and that only sufficient material remain in suspended form to hold the desired cross-sectional dimension.

By means of this invention, in order to provide the above-controlled amount of material between the two suspension points, the dip passes through a gap between a light source and a plurality of photocells. The phototransistor cells are so arranged that they are responsive when the light is cut off from them. The cells are connected to a variable speed drive on the motor which operates the conveyor. The arrangement is such that the top photocell operates the conveyor at its lowest speed while the bottom photocell operates the conveyor at its maximum speed. In order to properly control the festoon the photocells are located about a quarter of an inch apart so that the speed control of the conveyor is responsive to a very minute change in the amount of material suspended between the die and the conveyor. With this type of control any slight change in the speed of the extruder is passed along to the conveyor so that the amount of material suspended between the two is substantially the same at all times.

In order to accommodate strips of material of different cross-sectional size the photocells are arranged in two banks of six cells each so that if necessary the two banks can be spaced apart so as to take care of large diameter strips. With this arrangement the same minute control can be effected regardless of the dimension of the material being produced and conveyed from the extruder.

In order that this invention may be more readily understood it will be described in connection with the attached drawing, in which FIGURE 1 is an elevational view showing the extruder and the take-away conveyor;

FIGURE 2 is a top plan view showing the arrangement of the light source and the photocells in connection with the extruded tube;

FIGURE 3 is an enlarged view of the arrangement of photocells; and

Figure 4:
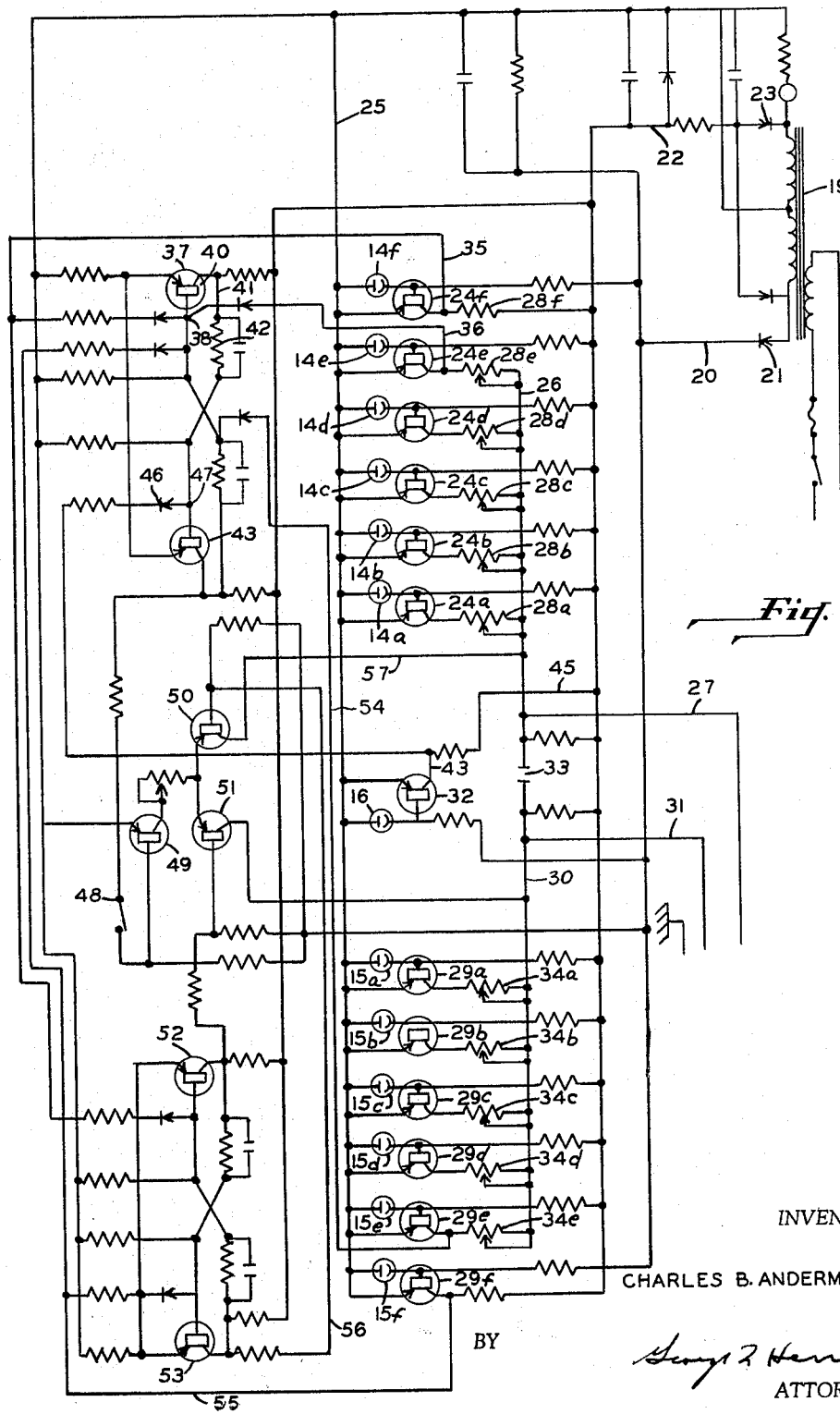
FIGURE 4 shows the electrical circuit utilized in carrying out the invention.

Referring to FIGURE 1, there is shown a conventional extrusion tuber 2 and a take-away conveyor 3. The material 4 formed by the extrusion tuber assumes a dip or slight festoon 5 between the extrusion nozzle 6 and the take-away conveyor 3. Positioned adjacent the newly formed tube as it passes from the extrusion nozzle 6 to the take-away conveyor 3 in FIGURE 1 is a housing 7 carrying a plurality of photocells which are positioned on a vertical plane with respect to the tube 4. Referring now to FIGURE 2, it will be seen that the light source 9 is positioned on one side of the newly formed tube while the housing 7 carrying the photocells is positioned on the opposite side of the newly formed tube. The positioning of the light source 9 with respect to the photocells is such that the light from the light source will be received by the photocells. The take-away conveyor 3 is driven by a motor 10 through a conventional belt drive 11. The conveyor 3 operates in a water bath 12 for the purpose of cooling and curing the newly formed tube. The purpose of the photocells is to determine the position of the tube in the festoon between the extrusion nozzle 6 and the take-away conveyor 3. The electrical circuitry is such that if the tube be above the photocells or below, the speed of the motor will be controlled accordingly to bring it back into the range of the photocells. The photocell circuitry is connected to a conventional General Electric Company Thymotrol drive unit 13 which controls the voltage to the motor 10 thereby determining the speed at which the motor 10 operates.

FIGURE 3 shows, in an enlarged view, the arrangement of the photocells. They are arranged in two banks, the top bank 14 comprising six cells and the bottom bank 15 comprising six cells with one cell 16 positioned intermediate. The bottom bank of cells is on an adjustable plate 17 which can be moved in a vertical direction by means of the knurled knob 18 positioned on the side of the housing 7. The reason for this adjustment is to accommodate strips of varying cross-sectional size. In the production of strip material such as tubing on equipment of this type, which tubing is to be subsequently used for pipe covering or other similar usage, it is necessary that the dimensions of tubes made on different runs vary over a rather wide range. For example, the exterior diameter of tubes which can be manufactured on this equipment ranges from ½″ in diameter to 3½″ in diameter. In order to accommodate these various diameters of tubes the photocells 15 on bottom panel 17 are so mounted that they can be brought to within ⅜″ of the photocells 14 at the top of the panel or can be moved as much as 4″ away from the top photocells.

Referring now to FIGURE 4, there is shown the electrical circuitry used in carrying out this invention. The transformer 19 has a positive line 20 carrying 45 volts direct current from the diode rectifier 21. The negative line 22 and diode rectifier 23 are connected to the other side of the transformer 19. This line 22 carries 33 volts direct current. The photocells 14a, 14b, 14c, 14d, 14e and 14f are in the top bank of the photocells shown at FIGURE 3. The first five of these photocells, 14a to 14e inclusive, are connected through suitable resistances across the 33-volt negative line 22 and a neutral line 25. Also connected to the photocells 14a to 14f inclusive are transistors 24a, 24b, 24c, 24d, 24e, and 24f. The base of each of the transistors 24a to 24e is connected across the negative 33-volt line 22 and the neutral line 25 through the same resistance arrangement as the adjoining photocells. The emitter for each of the transistors 24a to 24f is connected to the common line 25 and the collector for each of the transistors 24a to 24e is connected to a line 26 which is connected to line 27 leading to the variable drive unit. It will be noted that the voltage from the collector of transistors 24a to 24e passes through resistances 28 between the transistor and the line 26. In the preferred arrangement here under consideration, the resistance 28a is greater than the balance of the resistances. The resistances diminish proportionately from 28a to 28f for reasons which will be described later. These resistances can be adjusted by means of a slider to produce a signal proportional to the distance from the center portion.

The lower bank of photocells 15a to 15f and transistors 29a to 29f are connected in exactly the same manner as the top bank, with the exception that the line 30 is connected to the other line 31 leading to the variable speed drive control unit. The central control photocell 16 and its attendant transistor 32 are positioned in the center of the transistor panel. Voltages from the top bank of transistors are separated by a condenser 33 from the opposing voltages on the opposite bank of transistors.

During the preferred operation procedure the material being manufactured passes over photocell 16 and probably shadows the first photocell 14a and 15a of the top and bottom banks respectively. FIGURE 3 shows the tube 4 in this position. The voltage is such that the voltage in the line 27 is equal and opposite to the voltage on the line 31 if none of the photocells is shadowed on the top and bottom bank or if an equal number of photocells in the same position with respect to the intermediate cell 16 is shadowed. If more photocells on one bank are shadowed than on the other bank, the system is out of balance, and a voltage differential exists between lines 27 and 31, which out-of-balance condition changes the grid voltage on the variable speed control tube and alters the speed to return the tube or strip to the center position. Resistances 28a, 28b, 28c, 28d, and 28e and the resistances 34a, 34b, 34c, 34d, and 34e are such that the resistance from the transistors positioned closest to the center is greater than those farther away, and this resistance diminishes proportionately from the center toward the outer extremity. With this arrangement the voltage drop, if no voltage is supplied through resistance 28a, is less than the voltage drop if no voltage is supplied through resistance 28e. The same is true of the resistances 34a to 34e in the lower bank.

Transistors 24a to 24e and 29a to 29e produce a voltage when light shines on them, while transistors 24f and 29f produce a voltage when their attendant photocells are shadowed. This voltage on 24a to 24e and 29a to 29e is sufficient to cause the transistors to conduct. With the arrangement above described, when all photocells are illuminated the voltages are equal and opposite and the net signal is zero. The photocells 14a to 14e and 15a to 15e place a positive voltage on the base of transistors 24a to 24e and 29a to 29e respectively if the photocells are not shadowed. This positive voltage placed on the base causes the transistors 24a to 24e and 29a to 29e to conduct through the collector to the lines 27 and 31 respectively. However, if one of the photocells is shadowed a negative voltage is placed on the base of the attendant transistor and it ceases to conduct so that no voltage from that transistor is supplied to the line.

Transistor 24f and transistor 29f are connected across the neutral line 25 and line 20 carrying a 45-volt positive charge. With this arrangement when the photocells 14f or 15f are not shadowed, a negative voltage is placed on the base of transistors 24f or 29f. And when photocells 14f or 15f are shadowed a positive charge is placed on the base of transistors 24f or 29f, causing them to conduct. This means that when photocell 14f is shadowed the transistor 24f will conduct voltage through the line 35. When photocell 14e is not shadowed transistor 24e conducts through its colllector and line 36 to the base of transistor 37; however, the positive voltage from transistor 24e is not sufficient to buck the negative signal at point 38 caused by transistor 24f when photocell 14f is not shadowed. However, when photocell 14f is shadowed and 14e is not shadowed, then both transistors 24e and 24f are conducting and a positive voltage is placed on the base of transistor 37, causing it to conduct. When transistor 37 has started to conduct it will continue to do so through the lock-in circuit established by collector 40, line 41, resistor 42, transistor 43 and back to point 38. With this arrangement transistor 37 will continue to conduct until the lock-in circuit is broken. While transistor 43 is conducting its output in addition to completing the interlock circuit to transistor 37 is also supplied through the normally closed switch 48 to the base of transistor 49 causing it to conduct. The voltage from transistor 49 is supplied to the emitters of two transistors 50 and 51. The voltage supplied by photocell 14f causing transistor 24f to conduct in addition to causing transistor 37 to conduct also eliminates the negative signal on the base of transistor 52 causing it to conduct. The collector output of transistor 52 is supplied to the base of transistor 51 which causes conduction to take place. The voltage to the emitter has been set up as previously described to the switch 48 and transistor 49. The voltage from transistor 51 is fed to the line 31 which has the effect of making the upper bank output more negative thereby increasing the signal on the variable speed drive tending to slow the conveyor to lower the dip. This means that in the operation of the device, if the tube moves in an upwardly direction shadowing the photocells 14a to 14f progressively as it moves upwardly, when it shadows photocell 14f and moves above, the speed control affected thereby will continue until the tube moves down to the central position shown in FIGURES 1 and 3. When the tube returns to this central position it shadows photocell 16. Transistor 32 which is attendant to photocell 16 is connected in the same manner as transistor 24f and 29f so that it conducts only when its attendant photocell 16 is shadowed. When transistor 32 conducts it places a negative charge on point 47. This causes transistor 43 to cease conducting which breaks the interlock to transistor 37 and also removes the positive voltage on the base of transistor 51. Transistor 51 ceases conducting and the negative effect placed on the upper bank by reason of the voltage applied to line 31 by transistor 51 is removed. This, therefore, removes the control set up by the shadowing of photocell 14f.

When the shadow drops to the extreme lower position of the sensing system it will cover photocell 15f and allow the output of transistor 29f to cause transistors 37 and 53 to conduct in the following manner. When photocell 15e is not shadowed its attendant transistor 29e places a positive charge on point 38 at the base of transistor 37 through the line 54 and a portion of the interlock circuit to transistor 37. This positive charge, however, is not sufficient to overcome the negative charge placed on point 38 by reason of the transistor 29f which puts out a negative charge when photocell 15f is not shadowed. When 15f is shadowed, however, the transistor 29f puts out a positive charge on point 38 through line 55 causing transistor 37 to conduct in the manner described earlier. The output from transistor 29f also places a positive charge on the base of transistor 53, causing it to conduct, placing a charge on the base of transistor 50 through line 56. The output from transistor 50 passes through line 57 to line 26 which has the effect of making the lower bank output line more negative and thereby decreasing the signal to the Thymotrol unit, tending to speed the conveyor and raise the dip. This condition continues until the tube is raised to shadow the central photocell 16 at which time the interlock to transistor 37 is broken and the effect of the voltage supplied by transistor 50 is no longer impressed on Thymotrol drive unit.

It will be understood that after the tube has shadowed photocell 14f on its upward path or 15f on its downward path, the shading of any of the photocells 14a to 14f or 15a to 15f will have no effect on the speed of the conveyor until photocell 16 is shadowed, after which the system will again function as described.

I claim:

1. A control device for controlling the length of a festoon of newly formed, uncured, highly extensible material travelling in a substantially horizontal path at a variable speed from a forming device to a take-away conveyor, a variable speed drive for said take-away conveyor, said variable speed drive being responsive to a change in voltage supplied thereto, a festoon control device positioned between said forming device and said take-away conveyor to control the voltage supplied to said variable speed drive, said festoon control device comprising a plurality of light sources arranged on a vertical plane on one side of the path of travel of said material in said festoon and a plurality of photocells arranged on a vertical plane on the opposite side of the path of travel of said material, the arrangement being such that each photocell is in alignment with a light source and the beams of light from the plurality of light sources to the plurality of photocells pass through the vertical plane through which the festoon rises and falls, said light sources and said photocells being arranged in a top group and bottom group with one intermediate light source and photocell; each photocell is connected to a line to the variable speed drive; each photocell is connected to a transistor in series with the line to the variable speed drive; the transistors in the top group place a positive charge on the line while the transistors in the bottom group place a negative charge on the line; the uppermost and lowermost transistors supplying voltage when the light beam is broken while all the other transistors in the top and bottom banks supply voltage only when the beam is not broken, the circuit to the uppermost and lowermost transistors being provided with interlocks which keep the respective circuits closed until the beam of light to the central-most photocell is shadowed which energizes a transistor to break the interlock.

2. A control device for controlling the length of a festoon of newly formed, uncured, highly extensible material travelling in a substantially horizontal path at a variable speed from a forming device to a take-away conveyor, a variable speed drive for said take-away conveyor, said variable speed drive being responsive to a change in voltage supplied thereto, a festoon control device positioned between said forming device and said take-away conveyor to control the voltage supplied to said variable speed drive, said festoon control device comprising a plurality of light sources arranged on a vertical plane on one side of the path of travel of said material in said festoon and a plurality of photocells arranged on a vertical plane on the opposite side of the path of travel of said material, the arrangement being such that each photocell is in alignment with a light source and the beams of light from the plurality of light sources to the plurality of photocells pass through the vertical plane through which the festoon rises and falls, said light sources and said photocells being arranged in a top group and bottom group with one intermediate light source and photocell, each photocell being connected to a line to said variable speed drive; each photocell is connected to a transistor in series with said line to said variable speed drive; the transistors in the top group place a positive charge on the line while the transistors in the bottom group place a negative charge on the line; a resistance connected to each transistor, said resistances decreasing in resistance from the transistors closest the center photocell to the transistors at the extremity of the groups; the uppermost and lowermost transistors supplying voltage when the light beam is broken while all the other transistors in the top and bottom banks supply voltage only when the beam is not broken, the circuit to the uppermost and lowermost transistors being provided with interlocks which keep the respective circuits closed until the beam of light to the central-most photocell is shadowed which energizes a transistor to break the interlock.

3. A control device for controlling the length of a festoon of newly formed, uncured, highly extensible material travelling in a substantially horizontal path at a variable speed from a forming device to a take-away conveyor, a variable speed drive for said take-away conveyor, said variable speed drive being responsive to a change in voltage supplied thereto, a festoon control device positioned between said forming device and said take-away conveyor to control the voltage supplied to said variable speed drive, said festoon control device comprising a plurality of light sources arranged on a vertical plane on one side of the path of travel of said material in said festoon and a plurality of photocells arranged on a vertical plane on the opposite side of the path of travel of said material, the arrangement being such that each photocell is in alignment with a light source and the beams of light from the plurality of light sources to the plurality of photocells pass through the vertical plane through which the festoon rises and falls, said light sources and said photocells being arranged so that there is an intermediate cell and at least one cell above and one cell below; the top and bottom photocells being connected to a line to the variable speed drive; a transistor connected to each photocell; the transistor connected to the top photocell placing a positive charge on the line and the transistor to the bottom photocell placing a negative charge on the line; the circuit to the uppermost and lowermost transistors being provided with interlocks which keep the respective circuits closed until a beam of light to the central photocell is shadowed which energizes a transistor to break the interlock.

References Cited by the Examiner

UNITED STATES PATENTS

| | | | |
|---|---|---|---|
| 2,011,653 | 8/1935 | Rufsvold | 242—75.52 |
| 2,147,421 | 2/1939 | Bendz | 226—42 |
| 2,278,136 | 3/1942 | Otis et al. | 226—42 |
| 2,432,876 | 12/1947 | Formhals et al. | 242—75.52 |
| 2,448,835 | 9/1948 | Schefe | 226—42 |

(Other references on following page)

UNITED STATES PATENTS

| | | |
|---|---|---|
| 2,726,922 | 12/1955 | Merrill et al. _____ 18—2 |
| 2,907,565 | 10/1959 | Sauter _____ 226—42 |
| 3,044,725 | 7/1962 | Gams et al. _____ 242—75.52 |

FOREIGN PATENTS

| | | |
|---|---|---|
| 480,223 | 1/1952 | Canada. |
| 526,926 | 9/1940 | Great Britain. |

References Cited by the Applicant

UNITED STATES PATENTS

| | | |
|---|---|---|
| 2,295,327 | 9/1942 | Bendz. |
| 2,393,015 | 1/1946 | Bendz. |
| 2,544,467 | 3/1951 | Michel. |
| 2,715,244 | 8/1955 | Tasker. |
| 2,726,922 | 12/1955 | Merrill. |
| 2,737,089 | 3/1956 | Baumgartner. |
| 2,765,441 | 10/1956 | Gambrill. |
| 2,854,691 | 10/1958 | Strong. |
| 2,940,126 | 6/1960 | Sheridan. |
| 3,032,822 | 5/1962 | Maddock. |

RALPH G. NILSON, *Primary Examiner.*

M. A. LEAVITT, *Assistant Examiner.*